No. 839,126. PATENTED DEC. 25, 1906.
C. ELLIS.
PROCESS OF SMELTING IRON ORES.
APPLICATION FILED DEC. 26, 1905.
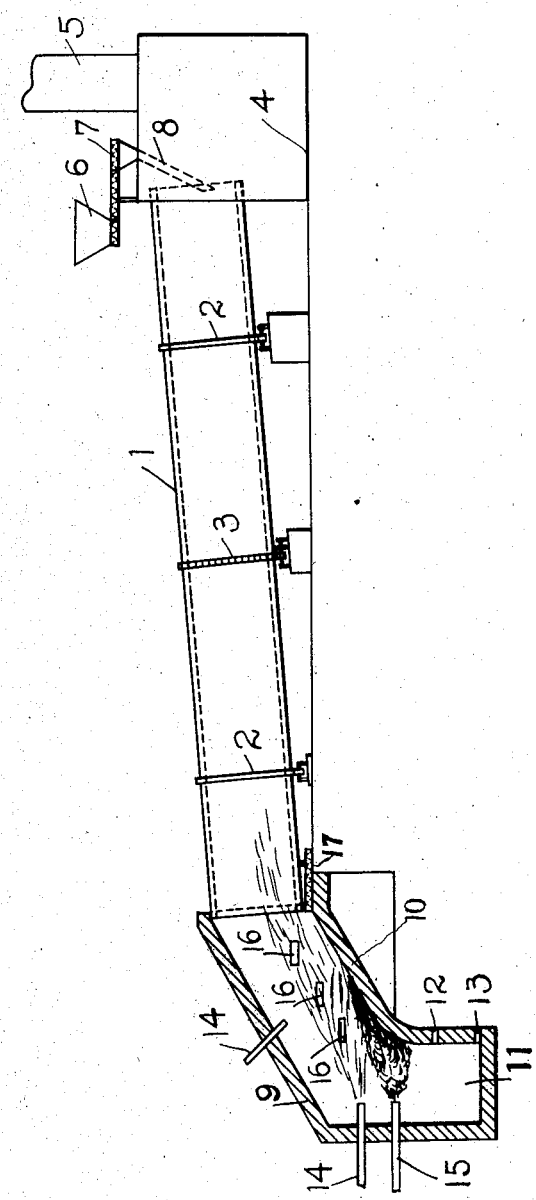

UNITED STATES PATENT OFFICE.

CARLETON ELLIS, OF WHITE PLAINS, NEW YORK.

PROCESS OF SMELTING IRON ORES.

No. 839,126.　Specification of Letters Patent.　Patented Dec. 25, 1906.

Application filed December 26, 1905. Serial No. 293,178.

*To all whom it may concern:*

Be it known that I, CARLETON ELLIS, a citizen of the United States, and a resident of White Plains, in the county of New York and State of New York, have invented certain new and useful Processes of Smelting Iron Ore, of which the following is a specification.

This invention relates to a process of reducing iron ore in a finely-divided condition or in a form which renders its smelting in the blast-furnace a troublesome operation unless briqueting is resorted to; and the object of this invention is to economically reduce fine ores, such as magnetic concentrates and the like, to a metallic state and under conditions which permit a greater economy of fuel than that secured in blast-furnaces and, moreover, without the usual limitations with respect to the fuel employed.

The blast-furnace is not a self-contained apparatus. Expensive units are required, including stoves, blowing-engines, &c., to secure a satisfactory output of metal with reasonable economy of operation. Unfortunately the blast-furnace is a sort of gas-producer. It is impossible to conduct its operation in such a manner that complete combustion is secured. Hence the array of accessories requisite in a modern blast-furnace plant.

My invention provides for the complete combustion of the fuel employed and for the employment of inexpensive units. Moreover, the smelting apparatus is self-contained, and therein as a heating agent may be used a variety of cheap fuels in place of the expensive hard coke which is required in the blast-furnace to bear the burden of the charge without crumbling. The blast-furnace is limited in height, and hence the sensible heat lost in the form of escaping gases is considerable, and owing to the limitation of height the sensible heat losses cannot be reduced below a certain uneconomical point.

My invention provides for cooling of the products of combustion to a very low temperature, so that the sensible heat loss is reduced to a minimum, and economy in fuel, as compared with the blast-furnace, results.

Efforts have been made to reduce iron ore without the agency of the blast-furnace; but such methods have not been entirely successful, so far as I am advised, owing, among other reasons, to the small output obtainable. Some proposals have been made for the production of spongy iron; but it has been found that the reduction of iron ore to spongy iron as ordinarily conducted is a very slow process.

My invention permits of the production of either spongy iron or molten iron and steel, according to the particular method of operation adopted.

The ore which I prefer to treat by my process is a pure grade of magnetite. Magnetic concentrates containing about sixty-six per cent. of iron or over and from one to three per cent. of silica are suitable, although I prefer a pure magnetite when such is obtainable, for in working with an ore of this sort there is very little slag to deal with, and, in fact, only that small quantity of slag is required which suffices to protect the molten metal.

The direct reduction of iron ore by means other than the blast-furnace embrace the following features of operation. There should be free movement of the ore in the receptacle employed. The products of combustion should leave the furnace substantially burned out—that is, containing no combustible matter which calls for stoves, boilers, gas-engines, &c., for utilization. The waste gases should also depart at a low temperature in order to minimize heat losses from this source. The metal should preferably be removed in the liquid condition, as spongy iron oxidizes very readily if transported while hot. Means should be provided for the efficient separation of the slag. The operation should be continuous and capable of affording a large output. The linings of the furnace employed must not be attacked by the ore or flux at the temperatures employed. The furnace should be so constructed that no clogging and building up of the ore to form obstructing masses is likely to occur. Means must also be provided for the introduction of fluxes and carburizing agents, the latter being preferably introduced when the ore has been heated nearly to the reduction temperature in order that carbon may be absorbed by the ore before it has opportunity to gasify. In order to withdraw the metal from the furnaces in a fused condition, it is necessary to introduce carbon into the iron sponge which first forms. It is therefore necessary to provide a carburizing agent at this stage of operation. Coke or coal, for instance, in contact with the sponge is rapidly absorbed to an extent sufficient to reduce the melting-point of the metal to a point at which it easily fuses and may be withdrawn in the molten state, thereby permitting a separation of the metal from the slag. The reduction of the ore calls for a reducing atmosphere and at the same time for a large output a high temperature. It is not difficult to reduce the magnetic oxid to the lowest oxid of iron—namely, FeO—but it is difficult to carry the ore past its lowest state of oxidation to the metallic state. Hence it is necessary to provide a powerful reducing atmosphere. A flame of high temperature ordinarily is oxidizing, as an excess of air must be admitted to secure the rapid combustion resulting in the development of high temperature. It is therefore necessary to control the flame or supply the heat in such a manner that rapid reduction is possible. All these features above described are embodied in the process to be hereinafter described.

My process of manufacturing iron or steel consists in the treatment of partially-heated ore under powerful reducing conditions with a high-temperature flame or heating agent and in bringing the gases of combustion resulting from such treatment into intimate contact with the cold ore, thereby causing the latter to become partially heated and preparing it for the reduction stage. During the step of preheating the fresh ore I prefer to agitate the ore in contact with the flame in such a manner that a rapid absorption of the heat occurs. This is preferably accomplished in a rotary inclined kiln. In order to secure the reducing atmosphere, I may use two flames of different characters, the one carrying an abundance of air, and therefore having a high temperature, and the other having insufficient air or no air at all. For the attainment of reducing conditions the latter flame or current may be interposed between the high-temperature flame and the ore in the manner described in Patent No. 803,886. Another method of securing the reducing conditions is to enter carbonaceous material at some point in the path of the travel of the ore. Prior investigators have attempted to feed ore and coal or coke into the upper end of an inclined rotary kiln and to apply a single high-temperature flame in the lower part, it being supposed that the fuel introduced with the ore would be sufficient to perform reduction. Actually it was found that the carbon burned away before it reached the lower part of the kiln and very little of the ore was reduced to the metallic state, although a large portion of it was reduced to ferrous oxid. Furthermore, as combustion of this fuel occurred in the upper part of the kiln the products of combustion departed at a high temperature and the heat loss from this source was considerable. My process involves the introduction of the carbonaceous fuel at a point near the final zone of reduction, and therefore obviates the above-mentioned difficulties.

For the performance of the process here set forth and claimed I have devised a certain novel combination of apparatus whereby the forces and materials concerned in the process are caused to coöperate in the relation necessary to its exercise, which apparatus is also claimed herein.

In the accompanying diagrammatic drawing the longitudinal section of a reducing-chamber is depicted and connecting thereto is shown in elevation a rotary kiln constructed to preheat the ore.

In the drawing, 1 is a rotary inclined kiln lined with refractory material and rotating on the bearings 2.

3 is the driving mechanism. The upper part of the kiln is inclosed by the housing 4, on which is situated the stack 5. The hopper 6 contains the cold ore which is fed by the conveyer 7 into the chute 8, from which it discharges into the upper end of the kiln.

9 is the reducing-chamber proper, provided with the stationary inclined hearth 10 and the metal-collecting pit 11, having the tapping-holes 12 and 13 for the slag and metal, respectively.

14 and 15 are pipes or ports through which the fuel and air are admitted.

14' is a special fuel-pipe for use when a very high temperature is required in the upper part of the inclined hearth. The port 14 ordinarily is constructed to deliver a mixture of air and fuel in such proportions that a high-temperature flame is produced, while the port 15 is arranged to produce a reducing-flame.

At 16 are shown doors in the side walls of the furnace through which bars may be introduced for assisting in the movement of the charge downwardly along the inclined hearth.

At 17 is situated a conveyer or feeding apparatus by means of which coal, coke, or other carbonaceous fuel or carburizing agent may be introduced into the reducing-chamber, preferably underneath the charge of ore, in such a manner as to be readily mixed therewith.

In operating this apparatus by my process I feed the ore in a predetermined amount from the hopper 6 into the kiln 1, which is put in rotation and thereby agitates and mixes the ore in a thorough manner. Through the port 14 I introduce a blast of powdered coal and air or a jet of oil or other fuel, it being understood that the air may be admitted in admixture with the fuel or, if desired, in proximity to the fuel through adjacent ports not here specifically shown, but whose construction and arrangement will be apparent to those skilled in the art to which this invention pertains. Ordinarily I prefer to have sufficient air admitted for the combustion of the fuel entering the port 14 to allow of ten or fifty per cent. excess air, this excess depending upon the character of the fuel. Through the lower port 14 a spray of oil or a current of producer or water gas or similar fuel may be entered, thus interposing between the high-temperature flame produced by the combustion of the fuel entering through 14 and the ore on the hearth 10 a strongly reducing atmosphere, which makes rapid reduction possible. The feeding apparatus 17 delivers finely-divided coal or coke onto the hearth and the ore falling from the lower end of the kiln 1 and in a partially-heated condition mixes more or less with the carbonaceous fuel entering by the feed 17, and this mixture moves downwardly along the hearth 10. By the combustion of the fuel admitted through 17 the reducing atmosphere is augmented and at the same time sufficient carbon is introduced to permit of carburizing the metal to an extent sufficient to permit of the withdrawal of the latter in a molten condition. As a flux calcareous or silicious matter according to the nature of the ore may be introduced either with the ore from the hopper 6 or through the conveyer 17. It is preferable, however, to introduce the fluxing material at the upper end of the kiln in order that the admixture with the ore may be thorough. Under certain conditions it is possible to have only a flame of an oxidizing nature in the chamber 9 and to dispense with the reducing-current otherwise admitted through the port 15. This may be accomplished by introducing a somewhat larger amount of carbonaceous fuel (e.g., coke) than would otherwise be used through the conveyer 17. The reduction of this carbon will create the necessary reducing atmosphere, and, too, without that premature combustion consequent on the introduction of carbonaceous material at the stack end of the apparatus.

It is evident that the stationary hearth 10 or chamber 9 may be of a rotary type, the carburizing agent being admitted at its upper end in manner above described. A rotary kiln, however, for a reducing-chamber for production of the molten metal is not wholly suitable, owing to the high temperature employed and consequent trouble from the linings, which in rotary furnaces, owing to the jarring, &c., of the apparatus, causes their rapid destruction. For the manufacture of spongy iron where the temperatures are not as high the rotary kiln may be advantageously employed. If the sponge is to be used in an open-hearth furnace as an addition to molten pig, reduction of the ore on the hearth 10 completely to the metallic state is unnecessary. The apparatus herewith shown is also adapted for making spongy iron, although the output is smaller than when the conditions are made such that the molten metal is produced. The rotary kiln 1 may be of any length desired. A length of from eighty to one hundred feet is sufficient to reduce the stack-gases to a low temperature.

With ores which have a tendency to agglomerate when subjected to a high temperature and which therefore give trouble through failure to move properly along the hearth 10 it is possible to provide the hearth with a shaking or tilting motion, whereby the feeding is rendered uniform. Such ores may, however, be reduced to sponge only and subsequently "balled" by manipulating with a bar through the openings 16. The balls so produced may then be squeezed and rolled, &c.

It should be borne in mind that under certain conditions carbon monoxid is in itself an oxidizing agent. Carbon monoxid deposits carbon by the reaction $2CO = C + CO_2$; but its deposition occurs, so far as I know, only in the presence of free iron or metals of the iron group and is not brought about by the oxids of these metals. Apparently carbon monoxid does not oxidize metallic iron directly, but indirectly, in that the iron causes deposition of carbon and formation of carbon dioxid, which latter then oxidizes iron to ferrous oxid, regenerating carbon monoxid. This reaction proceeds until equilibrium between the various reacting bodies is attained—that is to say, between metallic iron, ferrous oxid, carbon, carbon monoxid, and carbon dioxid. Equilibrium can only occur, according to the phase rule, for a single partial pressure of each of the two gases and a single total pressure of both gases. If the partial pressure of carbon monoxid and carbon dioxid in the furnace taken together are greater than this single critical pressure, then oxidation of the iron can take place with deposition of carbon. If the pressure is less, carbon can be deposited, but no iron oxidized. The value of this critical equilibrium pressure varies only with the temperature and has been determined by Schenck and Zimmermann as follows: At 500° centigrade the critical equilibrium pressure is fifteen millimeters; at 550° centigrade the critical equilibrium pressure is thirty-five millimeters; at 600° centigrade the critical equilibrium pressure is seventy millimeters; at 650° centigrade the critical equilibrium pressure is one hundred and forty-five millimeters; at 700° centigrade the critical equilibrium pressure is three hundred and five millimeters; at 750° centigrade the critical equilibrium pressure is five hundred and thirty-five millimeters; at 800° centigrade the critical equilibrium pressure is eight hundred millimeters.

Since the partial pressure of carbon monoxid and carbon dioxid are seldom less than two hundred and fifty millimeters, a reduction can take place down to 690° centigrade, and below that it stops. Therefore conditions of reduction on the hearth 10 of the reducing-chamber should be adjusted for most efficient operation to conform closely to the above requirements.

Having now described my invention, what I claim, and desire to secure by Letters Patent, is—

1. The process of reducing iron ore which consists in the preliminary step of drying and heating the ore with waste gases of combustion and in the secondary step of exposing the ore in a thin layer to a reducing-flame.

2. The process of reducing iron ore which consists in the preliminary step of drying and heating the ore while agitating in contact with hot waste gases of combustion and in the secondary step of exposing a layer of the ore to a reducing-flame.

3. The process of reducing iron ore which consists in exposing a progressively-advancing stream of magnetic iron ore to a current of hot products of combustion; in mixing with the heated ore a predetermined quantity of a fluxing and a carburizing agent; in subjecting the mixture to the simultaneous action of a high-temperature flame and an interposed reducing atmosphere, thereby heating said mixture to a high temperature, and in collecting and separating the metal and slag.

4. The process of manufacturing iron or steel which comprises the exposure of the partially-heated ore under reducing conditions to a high-temperature flame burning in free space; and in bringing the waste gases from said flame into contact with the cold ore thereby causing the latter to become partially heated.

5. The process of manufacturing iron and steel which comprises the treatment of the partially-heated ore in admixture with carbonaceous material with a high-temperature flame and in bringing the waste gases from said flame into contact with the cold ore, thereby causing the latter to become partially heated; and in agitating the ore during such partial heating, thereby causing it to acquire a uniform temperature.

6. The process of manufacturing iron and steel which comprises the treatment of a partially-heated and progressively-advancing mass of iron ore under reducing conditions with flame of high temperature; and in bringing the waste gases from said flame into contact with a stream of fresh ore, thereby causing the latter to become partially heated.

7. The process of manufacturing iron which comprises the treatment of a partially-heated and progressively-advancing mass of iron ore under reducing conditions with a flame of high temperature; in removing the metal and slag in a molten state; in separating the former from the latter by gravity; and in bringing the waste gases from said flame into contact with a fresh supply of ore thereby causing the latter to become partially heated; and in agitating the fresh ore during such preliminary heating.

8. The process of manufacturing iron which consists in the treatment of a progressively-advancing stream of partially-heated magnetic concentrates under reducing conditions with a high-temperature flame; in admixing therewith at the beginning of such treatment a quantity of carbonaceous material; and in subjecting said stream to a temperature sufficient to melt the metal; in separating the slag from the metal; in bringing the waste gases from said flame into contact with the cold ore thereby causing the latter to become partially heated, and in agitating said ore during such partial heating.

9. The process of manufacturing iron which consists in treating a traveling layer of iron ore with the waste gases from a high-temperature flame burning in free space, advancing such layer into contact with said flame, during contact admixing powdered fuel with the advancing ore, and removing the thereby-produced iron from the action of the flame.

10. The process of manufacturing iron which consists in treating a traveling layer of iron ore with the waste gases from a high-temperature flame burning in free space, advancing such layer into contact with said flame, during contact admixing powdered fuel with the advancing ore, and removing the thereby-produced iron from the action of the flame by transmitting into and through a reducing atmosphere.

Signed at New York, in the county of New York and State of New York, this 23d day of December, A. D. 1905.

CARLETON ELLIS.

Witnesses:
FLETCHER P. SCOFIELD,
FRED. I. SMITH.